April 15, 1952 J. T. FISHER 2,593,288
MECHANICAL INTERLOCKING MECHANISM FOR SWITCHES
Filed June 17, 1949 3 Sheets-Sheet 1

INVENTOR.
John T. Fisher
by Woodling and Krost
attys

April 15, 1952 J. T. FISHER 2,593,288
MECHANICAL INTERLOCKING MECHANISM FOR SWITCHES
Filed June 17, 1949 3 Sheets-Sheet 2
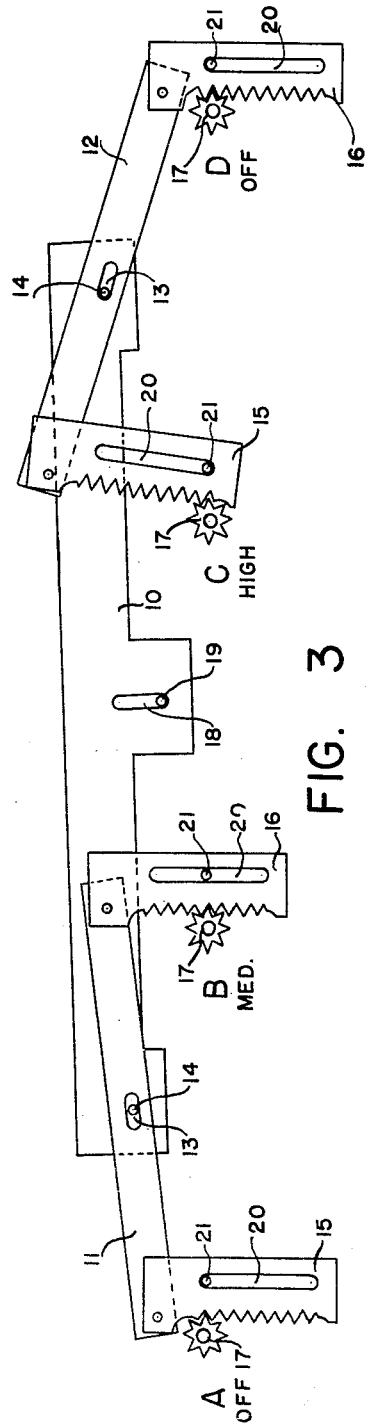
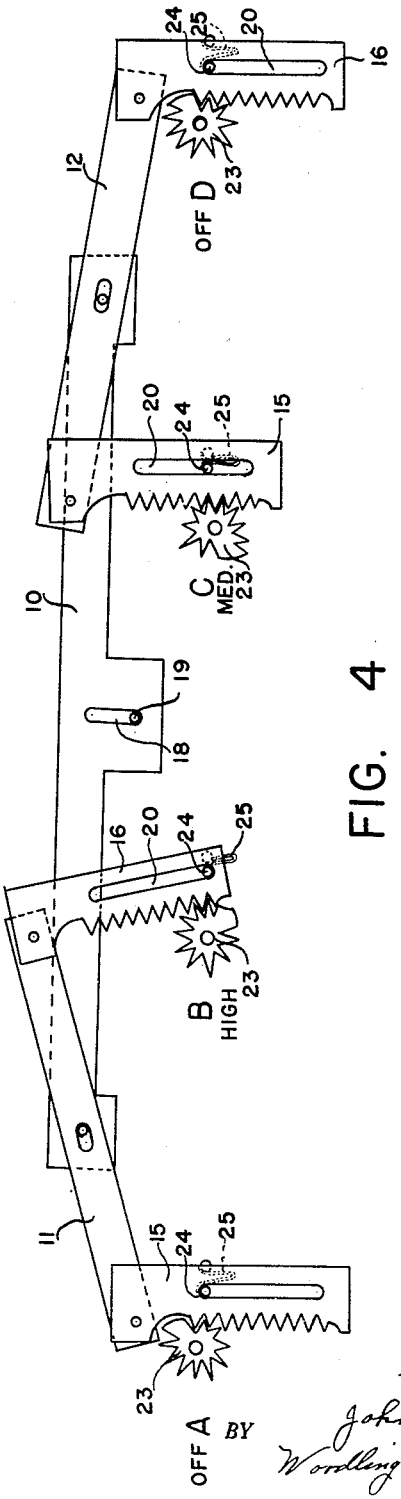
INVENTOR.
John T. Fisher
BY Woodling and Krost
Attnys.

April 15, 1952  J. T. FISHER  2,593,288
MECHANICAL INTERLOCKING MECHANISM FOR SWITCHES
Filed June 17, 1949  3 Sheets-Sheet 3
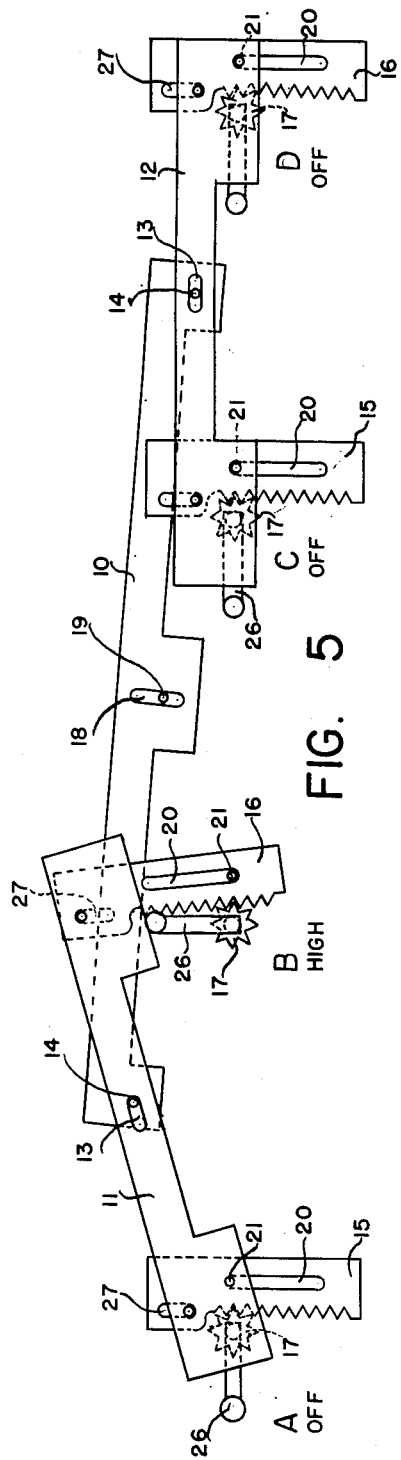
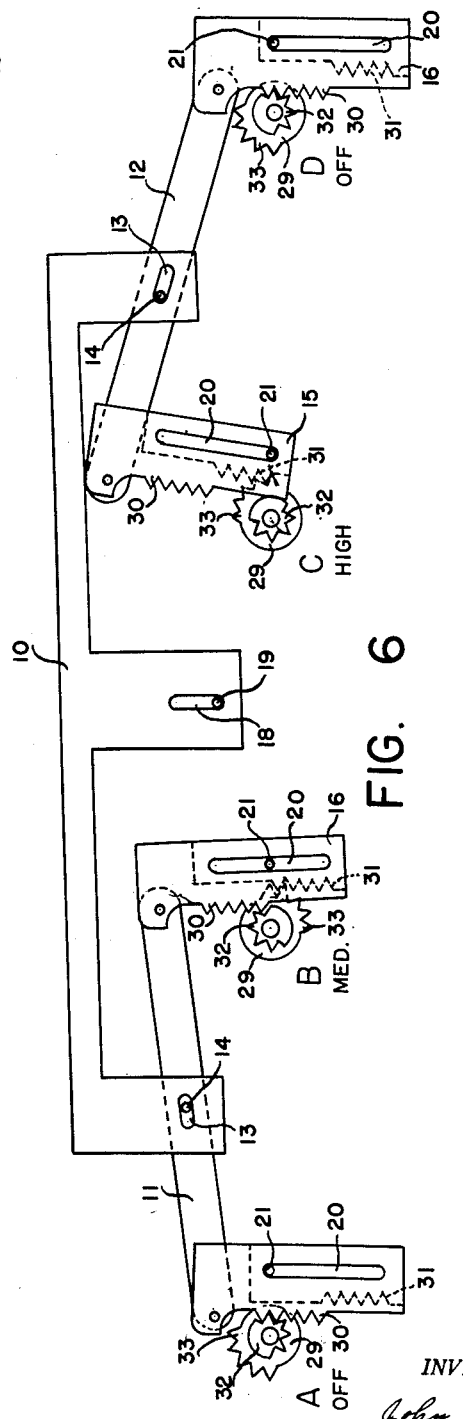
INVENTOR.
John T. Fisher
BY
Woodling and Krost
attys Patented Apr. 15, 1952

2,593,288

UNITED STATES PATENT OFFICE 2,593,288

MECHANICAL INTERLOCKING MECHANISM FOR SWITCHES

John T. Fisher, Mansfield, Ohio

Application June 17, 1949, Serial No. 99,656

20 Claims. (Cl. 200—50)

My invention relates in general to an interlocking mechanism for a plurality of load control switches which will allow the switches to be turned on until the total load has reached a predetermined maximum value. The preferred embodiment of my interlocking mechanism is described herein as being applied to electric rotary switches, each capable of occupying various "on" positions representing various respective degrees of heat in the heating elements of an electrical appliance, as well as occupying an "off" position. Electrical appliances having several heating units are often designed with the combined total load of all the heating units greatly exceeding the allowable total load capacity of a household wiring system. If all the switches were positioned on their high "on" positions, the total load would be greater than the maximum allowable load and thus establish a dangerous condition. Therefore, it is necessary to interconnect the switches in such a way that various degrees of heat may be obtained from the various heating elements at one time until the total load has reached a maximum value.

Prior to this time, many methods of electrically interconnecting the circuits and switches have been used. Some manufacturers have also attempted to use interlocking mechanisms of various types between switches, but each of these prior interlocking mechanisms have had limited usage, which rendered them usable with only a certain limited number of switches.

I have constructed a mechanical interlock comprising operators engaging members which are pivotally mounted on the ends of walking beams. The operators are mounted for movement with the switches and pivotally move the said members and the walking beams to permit the switches to be turned to any "on" position until the total power consumed by the appliance has equaled the predetermined safe maximum load value. Although my device is illustrated herein as interlocking four switches, it is understood that by having regulated tolerances of the parts, the device may be expanded and used for any number of switches. In that instance, the present disclosure would be a part of the total interlocking mechanism.

Therefore, one of the objects of my invention is to provide an interlocking mechanism for a plurality of load control switches, each capable of occupying at least an "on" position and an "off" position, wherein the interlocking mechanism has members pivoted on a pivotally mounted means and operators mounted for movement with the switches and cooperatively engaging the members to allow the switches to be turned from their "off" positions to their "on" positions until the total load consumed has reached a predetermined maximum value.

Another object of my invention is to provide an interlocking mechanism for a plurality of load control switches which will allow the switches to be turned on until the total load has reached a predetermined maximum value.

Another object of my invention is to provide an interlocking mechanism for a plurality of control switches.

Another object of my invention is to provide an interlocking mechanism for a plurality of control switches which will permit two or more control switches to be turned to their "on" positions at various degrees of heat until the total load has reached a predetermined maximum value.

Another object of my invention is to construct an efficient and sturdy interlocking mechanism which is inexpensive to manufacture and reliable in operation.

Other objects and a fuller understanding of my invention may be had by referring to the following description and claims, taken in conjunction with the accompanying drawings, in which:

Figure 3 is a plan view of my preferred interlocking mechanism illustrating the position of the walking beam and the pivot members carried thereby when one switch is turned to the high position and another switch to the medium position;

Figure 4 is a plan view of an interlocking mechanism wherein I use an eccentric gear;

Figure 5 is a plan view of an interlocking mechanism wherein a gear and lever are combined and showing one switch on high position; and Figure 6 is a plan view illustrating the use of a Geneva gear mounted on the switch shaft and engaging the pivot members.

Like parts of the interlocking mechanism illustrated in the drawings often have like reference characters, since the description of any one part applies to all similar parts in the mechanism.

Figure 1:
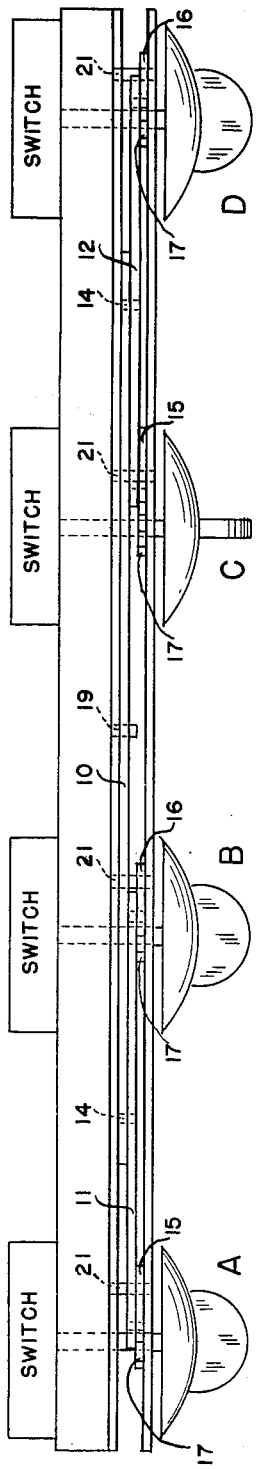
Figure 1 is a top view of the preferred embodiment of my interlocking mechanism.
Figure 2:
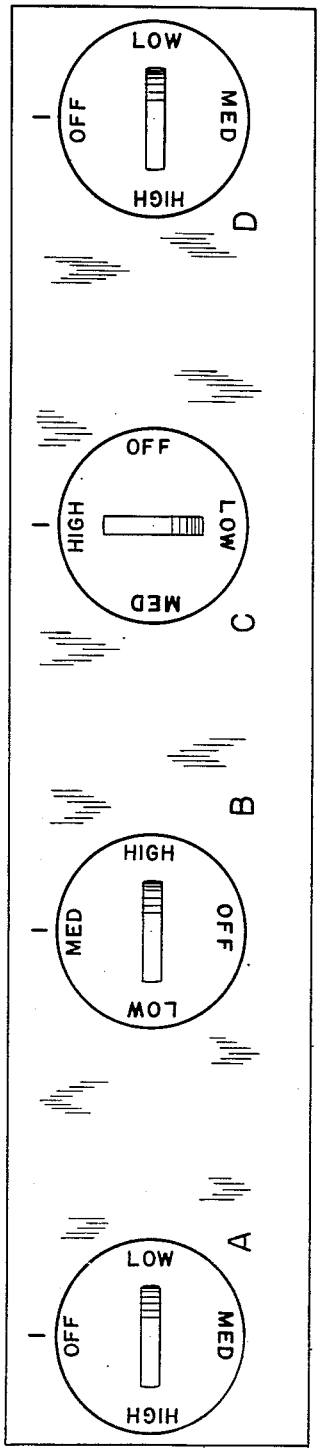
Figure 2 is a front elevational view of the mechanism.

The interlocking mechanism illustrated in Figures 1, 2 and 3 is designed to interlock a plurality of load control switches A, B, C and D. Each of these load control switches is capable of occupying at least an "on" position and an "off" position. Generally, the load control switches are designed to occupy a high "on" position, a medium "on" position lower than the high position, and a low "on" position lower than the medium position, as well as the "off" position. The load control switches A, B, C and D are rotary switches, such as are generally used in electric heating appliances, including electric stoves, to control the heat of each burner by controlling the load or electric power consumed by that burner. In many heating appliances where there are a plurality of heating elements, the total power or load which may be consumed by all of the heating elements when all of the switches are in the high "on" position is greater than the predetermined maximum value of power which may safely be drawn from the electric source of energy. My mechanical interlocking mechanism, the preferred embodiment of which is illustrated in Figures 1, 2 and 3, allows the switches to be turned from their "off" positions to their various "on" positions until the total power consumed by the appliance has reached a predetermined value.

The interlocking mechanism, as is best illustrated in the plan view of Figure 3, comprises a walking beam 10 pivotally mounted between the switches B and C. On each end of this walking beam 10 is a pivoted member designated by the reference characters 11 and 12. The pivoted members 11 and 12 are very similar, with each having a member slot 13 therein. The pivot pins 14, which pivotally fasten the pivot members 11 and 12 to their respective ends of the walking beam 10, extend through the member slots 13 so that the pivot members 11 and 12 have freedom of movement.

Since the like members in the interlocking mechanism are identical and their operations are so similar, throughout the description I have referred to them generically and not individually.

I have found it preferable to provide each end of the pivoted members 11 and 12 with toothed portions 15 and 16. The toothed portions 15 and 16 are preferably pivotally mounted on the ends of their respective pivot members.

The shaft of each of the switches A, B, C and D carries an operator mounted for movement with the shaft and engageable with the toothed portion of the pivot members 11 and 12. In Figure 1 I have used an ordinary gear for the toothed operator and have designated these with the reference character 17. As a switch is turned from the "off" position to one of the "on" positions, the toothed operator 17 is turned, thus raising the cooperatively engaged toothed portion of one of the pivot members.

In Figure 3, the plan view illustrates the switch A in an "off" position, the switch B in a medium position, the switch C in a high position and the switch D in an "off" position. The total load consumed by an appliance with the switches in these positions is not greater than the safe predetermined maximum value of the load. The switches A and D must remain in the "off" position until either the switch C or the switch B has been turned to a low load position. When either the switch B or the switch C is turned to a low position, the respective pivot member cooperatively engaged therewith will be pivoted, thus pivotally moving the walking beam 10. The walking beam 10 is also provided with a beam slot 18, through which the pivot support 19 extends for pivotally supporting the walking beam 10 between the load switches B and C. The walking beam 10 is lifted and moved upon turning of the switches A, B, C and D to different positions until the pivot support 19 engages one of the ends of the beam slot 18 of the walking beam 10. For example, when all of the switches are in their "off" position, the pivot support 19 will engage one end of the slot 18 of the walking beam 10 and, when the switches have been turned to their "on" positions until the total load has reached a predetermined maximum value, the pivot support 19 will engage the opposite end of the beam slot 18. In Figure 3, the load switches have been turned until the total load has reached a predetermined maximum value, thus the pivot support 19 is at one end of the beam slot 18.

I have found that the toothed portions 15 and 16 may be held in cooperative engagement with the toothed operators 17 carried by the switch shafts when the toothed portions 15 and 16 are pivotally mounted on their respective ends of their respective pivot members 11 and 12. By providing each of these toothed portions 15 and 16 with an elongated opening 20, through which a guide pin 21 extends, the teeth on the toothed portions are always enmeshed with the teeth on the toothed operators. The guide pins 21 are mounted a predetermined distance from the toothed operators 17 and are in a fixed position relative thereto.

In Figure 4 of my drawings, I illustrate a modification of my interlocking mechanism wherein I have substituted an eccentric gear 23 for the toothed operator. The eccentric gear 23 is mounted on the switch shaft in the same manner as the toothed operator and cooperatively engages the toothed portions of the pivot members. In this modification, I have found it necessary to mount a guide pin 24 on a spring 25 as a substitute for the fixed guide pin 21 of the structure illustrated in Figures 1, 2 and 3. The spring 25 is mounted in fixed position relative to the axis of the eccentric gear 23 with the spring 25 allowing the guide pin 24 to move towards and away from the axis of rotation of the eccentric gear 23 to keep the toothed portions enmeshed with the respective eccentric gears 23. The eccentric gears are always enmeshed with their respective toothed portion of the pivot members, since the floating guide pins 24 are restricted to a movement less than the height of the gear teeth. When eccentric gears are used, the last 90 degrees of turn of the load switch pivots the pivot member a greater degree of pivotal movement than the first 90 degrees of turn.

In Figure 5 of my drawings, I have illustrated the mounting of a lever 26 on the gear or toothed operator 17. This lever may be fastened to the gear 17 by any suitable means and each switch shaft is provided with the lever 26. When a switch shaft is rotated to its high position, as illustrated by the switch B of Figure 5, the lever 26 abuts the end of the pivot member and raises it or angularly pivots it a far greater amount than the regular teeth of the gear would for the same movement of the switch. In this instance, each of the toothed portions is provided with a slot 27, through which the pivot pin, which pivotally mounts the toothed portion on the end of the pivot member, extends. When the switch is turned with the lever abutting the pivot member, the pivot member is moved relative to the toothed portion with the connecting pin sliding in the slot 27 in the toothed portion. Thus, the angularly pivotal movement of the pivot member is greater during the movement of the switch from medium to high position, than during movement of the switch from "off" to low position.

In Figure 6 of my drawings, I illustrate the use of a Geneva gear 29, in place of either the eccentric gear or a gear and lever. In this instance, the toothed portions 15 and 16 are provided with a first and second set of teeth 30 and 31, respectively. The first set of teeth are positioned closest to the shaft of the switch and the second set of teeth are positioned farthest away from the shaft of the switch. The Geneva gear 29 also has a first and second set of gear teeth 32 and 33, respectively. The gear teeth 32 engage the first set of gear teeth 30 and the gear teeth 33 engage the second set of gear teeth 31. When the switch is in an "off" position, as illustrated by switch A in Figure 7, the gear teeth 32 engage the gear teeth 30. As the switch is turned through the low position to the medium position, the gear teeth 32 move the gear teeth 30, thus angularly pivoting the pivot member. The switch B in Figure 7 is positioned at medium load and illustrates the position of the toothed portion of the Geneva gear with the teeth 33 of the Geneva gear cooperatively entering engagement with the teeth 31 of the toothed portion. The switch C illustrates the cooperative meshing of the teeth 33 with the teeth 31.

I have discovered that by using this Geneva gear, wherein the teeth 32 are closer to the axis of rotation than the teeth 33, the angular movement of the pivot member, by moving the switch from medium to high, is far greater than the angular movement of the pivot member, by moving the switch from "off" to low position or from low to medium position. In this instance, it is possible to have one high load equal to two medium loads. The angular movement of the pivot members and the walking beam control the rotational movement of the switches A, B, C and D. By varying the diameter of the parts of the Geneva gear or the eccentricity of the eccentric gear or the length of the lever arm in Figure 5, I have found that the load consumed in any one of the "on" positions may be varied according to the desires of the builder. The high load consumed can be made equal to twice the load consumed when the switch is turned on medium position, or it can be made slightly greater than the medium load. However, with any proportioning of the loads consumed when the switches are turned to their "on" positions, the total load will not exceed the predetermined maximum value of power which may safely be drawn from the source of energy.

Although my invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An interlocking mechanism for a plurality of rotary load control switches each capable of occupying at least an "on" position and an "off" position, said interlocking mechanism comprising, rotary toothed operators mounted for movement with the switches, pivotally and shiftably mounted means, and members shiftably pivoted on said means and cooperatively and toothingly engaging with said rotary operators, said means and said members cooperating with said operators to allow the switches to be turned from their "off" positions to their "on" positions until the total turning of the switches has reached a predetermined maximum value.

2. An interlocking mechanism for a plurality of rotary load control switches each capable of occupying at least an "on" position and an "off" position, said interlocking mechanism comprising, rotary toothed operators mounted for rotary movement with the switches, a pivotally and shiftably mounted walking beam, and members shiftably pivoted on said walking beam and cooperatively and toothingly engaging said rotary operators, said beam and said members cooperating with said operators to allow the switches to be turned from their "off" position to their "on" positions until the total turning of the switches has reached a predetermined maximum value.

3. An interlocking mechanism for a plurality of rotary load control switches each capable of occupying a high "on" position, a lower "on" position and an "off" position, said interlocking mechanism comprising, rotary toothed operators mounted for movement with the switches, a pivotally and shiftably mounted walking beam, and members shiftably pivoted on said walking beam and cooperatively and toothingly engaging with said rotary operators, said beam and said members cooperating with said operators to allow the switches to be turned from their "off" position to their "on" positions until the total turning of the switches has reached a predetermined maximum value.

4. An interlocking mechanism for a plurality of load control switches each capable of occupying at least an "on" position and an "off" position, said interlocking mechanism comprising, gears mounted for movement with the switches, pivotally and shiftably mounted means, and members shiftably pivoted on said means and meshing with said gears, said means and said members cooperating with said gears to allow the switches to be turned from their "off" position to their "on" positions until the total load has reached a predetermined maximum value.

5. An interlocking mechanism for a plurality of load control switches each capable of occupying at least an "on" position and an "off" position, said interlocking mechanism comprising, gears mounted for movement with the switches, a pivotally and shiftably mounted walking beam, and members shiftably pivoted on said walking beam and meshing with said gears, said means and said members cooperating with said gears to allow the switches to be turned from their "off" position to their "on" position until the total turning of the switches has reached a predetermined maximum value.

6. An interlocking mechanism for a plurality of load control switches each capable of occupying at least an "on" position and an "off" position, said interlocking mechanism comprising, rotary toothed operators mounted for movement with the switches, a walking beam pivotally and shiftably mounted between the middle two of said switches, and members pivotally and shiftably mounted on opposite ends of said walking beam between two adjacent switches and cooperatively and toothingly engaging with the rotary operators of said adjacent switches, said beam and said members cooperating with said operators to allow the switches to be turned from their "off" position to their "on" position until the total turning of the switches has reached a predetermined maximum value.

7. An interlocking mechanism for a plurality of load control switches each capable of occupying at least an "on" position and an "off" position, said interlocking mechanism comprising, gears mounted for movement with the switches, a walking beam pivotally and shiftably mounted between the middle two of said switches, and members pivotally and shiftably mounted on opposite ends of said walking beam between two adjacent switches and meshing with the gears of said adjacent switches, said beam and said members cooperating with said gears to allow the switches to be turned from their "off" position to their "on" position until the total turning of the switches has reached a predetermined maximum value.

8. An interlocking mechanism for a plurality of load control switches, each capable of occupying at least an "on" position and an "off" position, said interlocking mechanism comprising, eccentric gears mounted for movement with the switches, pivotally and shiftably mounted means, and members shiftably pivoted on said means, said members having pivotal toothed portions meshing with said eccentric gears, said means and said members cooperating with said gears to allow the switches to be turned from their "off" position to their "on" positions until the total turning of the switches has reached a predetermined maximum value.

9. An interlocking mechanism for a plurality of load control switches each capable of occupying at least an "on" position and an "off" position, said interlocking mechanism comprising eccentric gears mounted for movement with the switches, a pivotally and shiftably mounted walking beam, and members shiftably pivoted on said walking beam, said members having pivotal toothed portions meshing with said eccentric gears, said beam and said members cooperating with said gears to allow the switches to be turned from their "off" position to their "on" positions until the total turning of the switches has reached a predetermined maximum value.

10. An interlocking mechanism for a plurality of load control switches, each capable of occupying at least an "on" position and an "off" position, said interlocking mechanism comprising, Geneva gears mounted for movement with the switches, pivotally and shiftably mounted means, and members shiftably pivoted on said means, said members having pivotal toothed portions meshing with said Geneva gears, said means and said members cooperating with said gears to allow the switches to be turned from their "off" position to their "on" positions until the total turning of the switches has reached a predetermined maximum value.

11. An interlocking mechanism for a plurality of load control switches, each capable of occupying at least an "on" position and an "off" position, said interlocking mechanism comprising, Geneva gears mounted for movement with the switches, a pivotally and shiftably mounted walking beam, and members shiftably pivoted on said walking beam, said members having pivotal toothed portions meshing with said Geneva gears, said beam and said members cooperating with said gears to allow the switches to be turned from their "off" position to their "on" positions until the total turning of the switches has reached a predetermined maximum value.

12. An interlocking mechanism for a plurality of load control switches, each capable of occupying at least an "on" position and an "off" position, said interlocking mechanism comprising, operators mounted for movement with the switches, pivotally and shiftably mounted means, and members shiftably pivoted on said means, said members having pivotal portions cooperatively engaging with said operators, said means and said members cooperating with said operators to allow the switches to be turned from their "off" positions to their "on" positions until the total turning of the switches has reached a predetermined maximum value.

13. An interlocking mechanism for a plurality of load control switches, each capable of occupying at least an "on" position and an "off" position, said interlocking mechanism comprising, operators mounted for movement with the switches, a walking beam pivotally and shiftably mounted between the middle two of said switches, and members pivotally and shiftably mounted on opposite ends of said walking beam between two adjacent switches, said members having pivotal portions cooperatively engaging with the operators of said adjacent switches, said beam and said members cooperating with said operators to allow the switches to be turned from their "off" position to their "on" positions until the total turning of the switches has reached a predetermined maximum value.

14. An interlocking mechanism for a plurality of load control switches each capable of occupying at least an "on" position and an "off" position, said interlocking mechanism comprising, gears mounted for movement with the switches, pivotally and shiftably mounted means, and members shiftably pivoted on said means, a lever carried by each of said gears and abuttable against its respective member to move the same upon rotation of said gear, said members each having shiftable toothed portions meshing with the respective gears, said means and said members cooperating with the levers and said gears to allow the switches to be turned from their "off" position to their "on" positions until the total turning of the switches has reached a predetermined maximum value.

15. An interlocking mechanism for a plurality of load control switches each capable of occupying at least an "on" position and an "off" position, said interlocking mechanism comprising, gears mounted for movement with the switches, a walking beam pivotally and shiftably mounted between the middle two of said switches, and members pivotally and shiftably mounted on opposite ends of said walking beam between two adjacent switches, a lever carried by each of said gears and abuttable against its respective member to move the same upon rotation of said gear, said members each having toothed portions meshing with the respective gears, said beam and said members cooperating with the levers and the gears to allow the switches to be turned from their "off" position to their "on" positions until the total turning of the switches has reached a predetermined maximum value.

16. An interlocking mechanism for a plurality of angularly movable elements, each capable of being angularly moved from a first position to a second position, said interlocking mechanism comprising, toothed operators mounted for angular movement with the elements, pivotally and shiftably mounted means, and members shiftably pivoted on said means and cooperatively and toothingly engaging with said toothed operators, said means and said members cooperating with said operators to allow the angularly movable elements to be angularly moved from their first positions to their second positions until the total angular movement of the elements has reached a predetermined maximum value.

17. An interlocking mechanism for a plurality of angularly movable elements, each capable of being angularly moved from a first position to a second position, said interlocking mechanism comprising, eccentric toothed operators mounted for angular movement with the elements, pivotally and shiftably mounted means, and members shiftably pivoted on said means and cooperatively and toothingly engaging with said eccentric toothed operators, said means and said members cooperating with said operators to allow the angularly movable elements to be angularly moved from their first positions to their second positions until the total angular movement of the elements has reached a predetermined maximum value.

18. An interlocking mechanism for a plurality of angularly movable elements, each capable of being angularly moved from a first position to a second position, said interlocking mechanism comprising, Geneva gears mounted for angular movement with the elements, pivotally and shiftably mounted means, and members shiftably pivoted on said means and cooperatively and toothingly engaging with said Geneva gears, said means and said members cooperating with said gears to allow the angularly movable elements to be angularly moved from their first positions to their second positions until the total angular movement of the elements has reached a predetermined maximum value.

19. An interlocking mechanism for a plurality of angularly movable elements, each capable of being angularly moved from a first position to a second position, said interlocking mechanism comprising, operators mounted for angular movement with the elements, pivotally and shiftably mounted means, members shiftably pivoted on said means and cooperatively engaging with said operators, a lever mounted for movement with each of said operators and abuttable against its respective member to move the same upon movement of said operator, said means and said members cooperating with said operators and said levers to allow the angularly movable elements to be angularly moved from their first positions to their second positions until the total angular movement of the elements has reached a predetermined maximum value.

20. An interlocking mechanism for a plurality of angularly movable elements, each capable of being angularly moved from a first position to a second position, said interlocking mechanism comprising, operators mounted for angular movement with the elements, pivotally and shiftably mounted means, and members shiftably pivoted on said means and cooperatively engaging with said operators, said means and said members cooperating with said operators to allow the angularly movable elements to be angularly moved from their first positions to their second positions until the total angular movement of the elements has reached a predetermined maximum value.

JOHN T. FISHER.

REFERENCES CITED

The following references are of record in the file of this patent:

UNITED STATES PATENTS

| Number | Name | Date |
| --- | --- | --- |
| 1,232,793 | Grimes | July 10, 1917 |
| 1,634,121 | Sederholm | June 28, 1927 |
| 2,080,964 | Forstrom | May 18, 1937 |